United States Patent [19]

Takenouchi et al.

[11] Patent Number: 4,900,636
[45] Date of Patent: Feb. 13, 1990

[54] METAL PLATE LAMINATED BODY

[75] Inventors: Syoishi Takenouchi, Toyota; Kazuhiro Morita, Anjo; Shinichi Ezaka, Kariya; Yoshitaka Kuroda, Anjo, all of Japan

[73] Assignee: Nippondenso Co., Ltd., Kariya, Japan

[21] Appl. No.: 208,571

[22] Filed: Jun. 20, 1988

[30] Foreign Application Priority Data

Sep. 8, 1987 [JP] Japan .................. 62-224927
Sep. 11, 1987 [JP] Japan .................. 62-228969

[51] Int. Cl.$^4$ ............................. H01F 27/26
[52] U.S. Cl. ................... 428/571; 428/573; 428/582; 428/594; 336/217
[58] Field of Search ............ 428/571, 603, 579, 638, 428/594, 523, 582; 336/210, 234, 217; 310/216, 217, 254

[56] References Cited

U.S. PATENT DOCUMENTS

| 2,671,951 | 3/1954 | Sliwiak | 336/234 |
| 2,912,608 | 11/1959 | Ploran | 310/217 |
| 2,975,312 | 3/1961 | Ploran | 310/217 |
| 3,202,851 | 8/1965 | Zimmerle et al. | 310/259 |
| 3,590,208 | 6/1971 | Martini | 310/217 |
| 4,160,182 | 6/1979 | Mitsui | 310/217 |
| 4,264,663 | 4/1981 | Beenken | 310/217 |
| 4,272,579 | 6/1981 | Mitsui | 310/217 |
| 4,364,169 | 12/1982 | Kawano et al. | 310/216 |
| 4,728,842 | 3/1988 | Martin | 310/217 |

FOREIGN PATENT DOCUMENTS

| 603175 | 8/1960 | Canada | 310/216 |
| 917626 | 7/1954 | Fed. Rep. of Germany | 310/217 |
| 49-37103 | 4/1974 | Japan . | |
| 53-85306 | 7/1978 | Japan . | |
| 54-141372 | 11/1979 | Japan . | |
| 55-117221 | 9/1980 | Japan | 336/210 |
| 58-116033 | 7/1983 | Japan | 310/216 |
| 58-224532 | 12/1983 | Japan | 310/217 |
| 60-99432 | 6/1985 | Japan . | |
| 60-113632 | 6/1985 | Japan | 310/216 |
| 62-147925 | 7/1987 | Japan | 310/217 |
| 484501 | 2/1970 | Switzerland | 336/234 |
| 1044525 | 10/1966 | United Kingdom | 336/234 |

Primary Examiner—John J. Zimmerman
Attorney, Agent, or Firm—Cushman, Darby & Cushman

[57] ABSTRACT

There is disclosed a metal plate laminated body. When a portion encircled by inner and outer closed curves is embossed, a projection is protruded from a lower surface of a metal plate. Since a width of protrusion is slightly larger than that of a recess, when press-fitting the projection into the recess of the contiguous metal plate, an outer peripheral surface of the projection which is formed along the outer closed curve is brought into press-contact with an outer peripheral surface of the recess; and an inner peripheral surface of the projection which is formed along the inner closed curve similarly comes in press-contact with an inner peripheral surface of the recess. These inner and outer peripheral surfaces cooperate to become effective contactual surfaces, and the contiguous metal plates are joined to each other.

10 Claims, 11 Drawing Sheets

METAL PLATE LAMINATED BODY

BACKGROUND OF THE INVENTION

FIELD OF THE INVENTION

The present invention is generally directed to a metal plate laminated body employed as a laminated iron core or the like of electric appliances, and more particularly, to configurational improvement of a caulking embossed projection for laminate-caulking a metal thin plate.

DESCRIPTION OF THE PRIOR ART

Disclosed in Japanese Patent Laid-Open Publication No. 141372/1979, excepting a rivet fastening method and a welding method, is a conventional combining structure wherein: a metal plate is partically formed with a configurational portion 9 arranged such that: its outer periphery is, as illustrated in FIGS. 20 and 21, circular; part of the outer periphery is notched along this outer periphery and end portion thereof is formed to made an acute angle; and the configurational portion 9 is embossed, thereby forming a recess 9a and a projection 9b.

In the above-described conventional combining structure, however, through joining forces act in the directions indicated by arrows in FIG. 20, effective contactual surface in any structure is merely an entire portion or part of the circular outer periphery of the embossed projection 9b which is shaped by one closed curve. Since the effective contactual surface is small, the joining forces are weak. In addition, if only a slight positional deviation of the embossed projection of a contiguous metal plate takes place, a gap is formed between the projection and the recess. As a result, some defects are caused. There is produced a sharp drop in pressure of contactual surface when the press-fit is effected; and the joining forces between the adjacent metal plates are thereby remarkably decreases.

Especially in a winding type laminated iron core wound with a lengthy metal thin plate, the metal thin plate is wound cylindrically after forming the embossed projection, whereby the metal thin plate undergoes plastic deformation. It is difficult to accurately position the embossed projection of the contiguous metal thin plate. Though the positional deviation of the embossed projection is corrected by inserting a positioning pin therein after the winding process, the whole portion is press-fitted at a time in a partially-deviated-state. For this reason, an edge of the projection 9b is brought into contact with an edge of the recess 9a, thereby causing deformation. As shown in FIG. 22, this further results in creation of a gap 10 between the projection 9b and the recess 9a. The pressure of contactual surface at the press-fitting time sharply decreases with a still smaller contactual area, which further leads to a remarkable drop in the joining forces between the contiguous metal thin plates. There exists an outstanding difference in joining force between a press-fitting portion joined in a state of creating the gap 10 and another press-fitting portion joined without causing any gap. This conduces to such a defect that a stable strength can not be obtained

SUMMARY OF THE INVENTION

It is a primary object of the present invention to provide a combining structure of a metal plate laminated body, this combining structure being capable of exhibiting a larger joining force than in a conventional combining structure minimizing a drop in the joining force that is due to positional deviation between embossed projections, and obtaining a stable strength.

To this end, according to one aspect of the invention, there is provided a joining structure of a winding type laminated iron core capable of attaining a sufficient joining strength without augmenting production costs and decreasing magnetic performance of the iron core simply by increasing the number of engaging projections to be disposed.

These and other objects, features and advantages of the invention will becomes more apparent on reading the following detailed description with reference to the accompanying drawings.

DETAILED DESCRIPTION OF THE PREFERRED EMBODIMENTS

Figure 1:
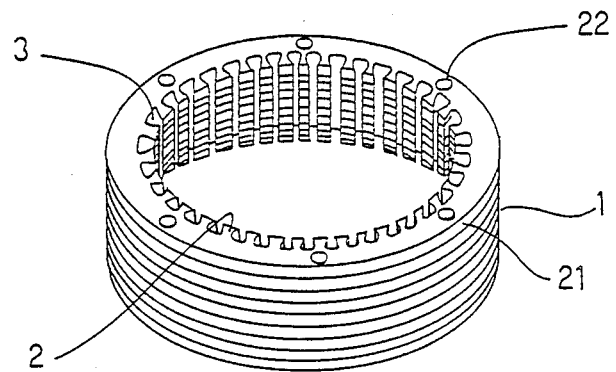
FIG. 1 is a perspective view of a laminated body, illustrating a first embodiment of the present invention.

Embodiments of the present invention will hereinafter be described in detail with reference to the accompanying drawings.

A first embodiment of the present invention is illustrated in FIGS. 1 through 4.

A fixed iron core 1 (e.g., utilized for a stator core of an AC generator for a motor vehicle) of a rotary electric machine which is shown in the embodiment is constructed by laminating a multiplicity of annular metal single plates 21. This iron core 1 is formed with 36 pieces of iron core teeth 2 and 36 slots per circumference. The metal single plates 21 are each provided with six pieces of projection parts 22. As can be observed form the enlarged illustrations of FIGS. 2 and 3, an annular portion 25 encircled by two concentric circles 23 and 24, i.e., an outer closed curve and an inner closed curve, is embossed, thus forming the projection part 22. Annular recess 26 is formed in an upper surface of the metal single plate 21, while an annular projection 27 is provided on a lower surface thereof. The annular portion 25 is embossed by using a punch and a die which each assume a predetermined configuration, whereby the annular projection 27 is protruded from the underside of the metal single plate 21.

The metal single plate 21 is 0.6(mm) in thickness, and the annular projection 27 is 0.4(mm) in height. A diameter $D_1$ of an outer peripheral circle of the annular projection 27 is arranged to be slightly larger than a diameter $D_2$ of that of the annular recess 26. A diameter of $D_3$ of an inner peripheral circle of the annular recess 26 is slightly larger than a diameter $D_4$ of that of the annular projection 27. In this case, the diameter $D_2$ is 3(mm), and the diameter $D_3$ is 1.5(mm).

Next, some consideration will be given to a press-fit space $\delta_1 = D_1 - D_2$ and another press-fit space $\delta_2 = D_3 - D_4$. In general, the press-fit space $\delta_1$ can be expressed such as:

$$\delta_1 = \frac{4 RP}{E},$$

where E defined as the Young's modulus of steel is 21,000 kg/mm$^2$; P defined as the direct pressure of SPCC (cold-rolled steel plate) is 20 kg/mm$^2$; and R defined as the radius is 1.5 mm. When substituting these values into the above-described formula, $\delta_1 = 6.3(\mu m)$ is established.

Judging from an error (approximately 5($\mu$m)) created when manufacturing the punch and die, however, it is appropriate that the press-fit space is set larger than 10 $\mu$m. As the press-fit space & increases, the tip portion of the annular projection 27 is considerably deformed just when press-fitting the annular projection 27 in the annular recess 26, resulting in diminution of the rectilinear portion of the annular projection 27 to be press-fitted. Thus causes a decrease in joining force. For this reason, where the projection 27 having the height of 0.5 mm or thereabouts is concerned, if the press-fit space $\delta$ exceeds 40 $\mu$m, the arrangement proves to be unpractical because of the decline in joining force.

In this embodiment, the press-fit space is set to 20 $\mu$m in the view of manufacturing accuracy of the punch and die, and also a life-span depending on abrasion of the puch and die.

Figure 2:
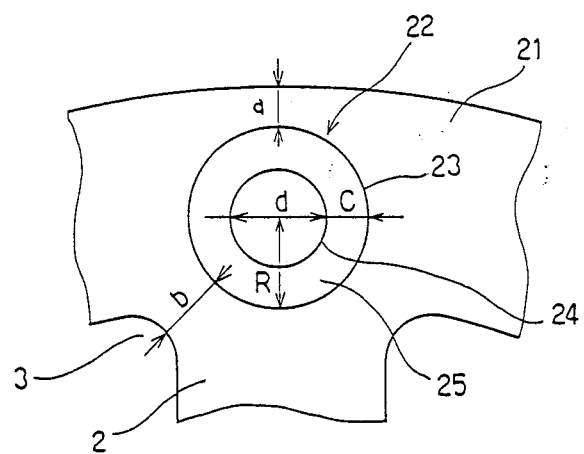
FIG. 2 is an enlarged plan view showing the principal portion of a projection in the first embodiment of the present invention.
Figure 3:
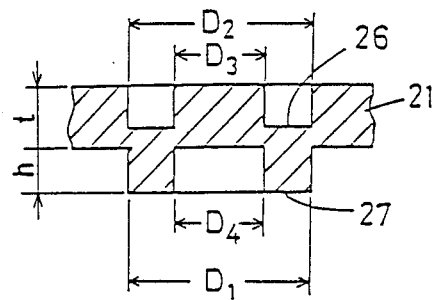
FIG. 3 is a cross-sectional view thereof.

The projection part 22 is, as shown in FIG. 2, formed at the proximal portion of the tooth 2. A space a between the outer closed curve 23 and the outer periphery of the metal single plate 21 and a space b between the outer closed curve 23 and a slot 3 are arranged to be larger than a thickness t (0.6 mm) of the metal single plate 21.

A space c between the outer closed curve 23 and an inner closed curve 24 and a diameter d of the inner closed curve 24 are similarly greater than the thickness t of the metal single plate 21.

With the above-described arrangement, it is possible to eliminate the deformation of the projection part 22 when being formed and to restrain the decrease in joining force.

Figure 4:
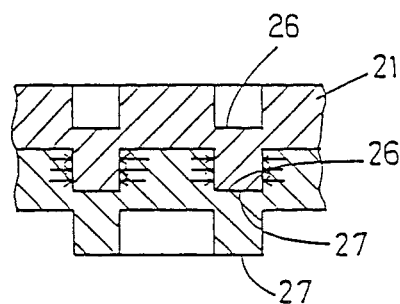
FIG. 4 is an enlarged cross-sectional view depicting a stage where two sheets of metal plates formed with the annular projections in the first embodiment are laminated.

The metal single plates 21 including the thus formed annular embossed projection portions 22 are laminated and then pressed, at which time the annular projection 27 is, as shown in FIG. 4, press-fitted in the annular recess 26. The outer peripheral surface of the annular projection 27 undergoes forces acting, as indicated by arrows of FIG. 4, in the radial direction from the outer peripheral surface of the annular recess 26 in the contiguous metal single plate 21, and its diameter is thereby shrunk. In contrast, the inner peripheral surface of the annular projection 27 receives forces acting in the radial direction from the inner peripheral surface of the annular recess 26 in the contiguous metal single plate 21, with the result that the diameter thereof is enlarged. In this manner, the pressures given from the inner and outer surfaces are exerted on the annular projection 27, so that a large pressure of contactual surface between the annular projection 27 and the annular recess 26 is produced. Besides, because the inner and outer surfaces of the annular projection 27 and the annular recess 26 serve as effective contactual surfaces, an effective contactual area between them increases. There is a slight positional deviation between the annular projection parts 22 of the metal single plates 21 contiguous to each other, whereby gaps are created between inner and outer peripheral portions of the annular projection 27 and the inner and outer peripheral portions of the annular recess 26. Even in such a case, as described above, the pressure working in the opposite directions are exerted on the inner and outer surfaces of the annular projection 27, and this projection 27 is held by the annular recess 26. As a result, the decline in pressure of contactual surface between the annular projection 27 and the annular recess 26 is minimized.

Figure 5:
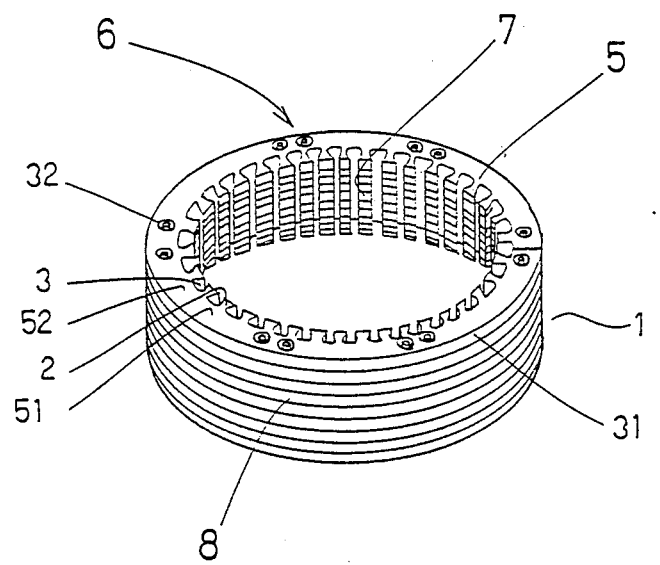
FIG. 5 is a schematic perspective view of a winding type laminated iron core, illustrating a second embodiment of the present invention.
Figure 6:
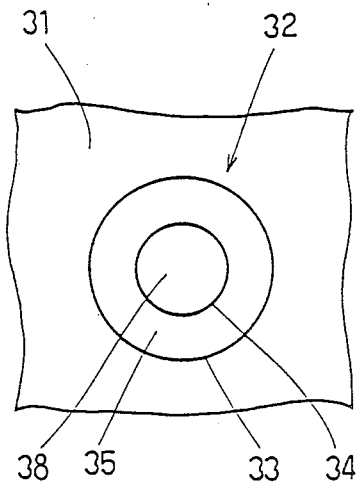
FIG. 6 is an enlarged plan view illustrating the principal portion of the projection in the second embodiment.
Figure 7:
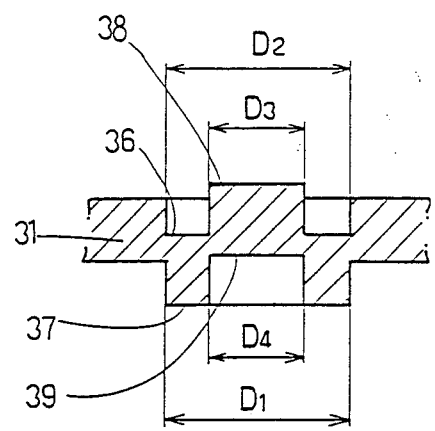
FIG. 7 is an cross-sectional view thereof.

A second embodiment of the present invention is shown in FIGS. 5 through 12. The fixed iron core 1 of the rotary electric machine is classified as a winding type laminated iron core on which a lengthy metal thin plate 31 is wound. A projection part 32 formed on the lengthy metal thin plate 31, as illustrated in FIGS. 6 and 7, resembles the previous projection part 22 shown in the first embodiment. The arrangement is such that and inner peripheral mid-portion 38 encircled by an inner closed curve 24 is protruded with a height l (approximately 0.05 mm) in the direction opposite to the direction in which an annular portion 35 is embossed. The upper surface of the metal thin plate 31 is formed with the mid-portion 38 projecting from the outer peripheral portion defined by an outer closed curve 33, and with an annular recess 36. An annular projection 37 is provided on the underside of the metal thin plate 31. Formed in this underside of the metal thin plate 31 is a circular recess 39 which is recessed towards the upper surface thereof by one stage from the outer peripheral portion of the annular projection 37. The annular projection 37 and the protruded mid-portion 38 are simultaneously embossed by using the punch and die, which each assume a predetermined configuration, in cooperation with a pressing machine.

The projection part 32 are, as shown in FIG. 5, provided on tooth corresponding portion yokes 51 corresponding to the proximal portions of iron core teeth 2 of a yoke 5. The projection part 32 are consecutively disposed by twos to constitute tooth disposing projection groups 6. Six projection groups 6 are disposed with a 60° spacing per circumference.

Figure 8:
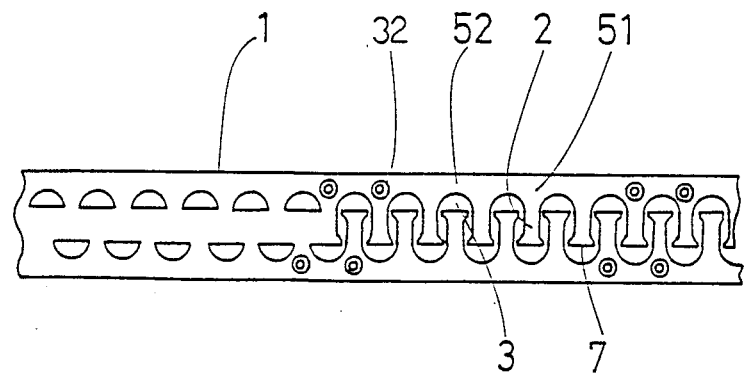
FIG. 8 is a plan view of a metal thin plate, depicting a state before being wound up.

The metal thin plate 31 constituting the iron core assumes a band-like configuration in its initial state. From this state, as shown in FIG. 8, embossing formation is effected on the metal thin plate 31 so that iron teeth 2 and slots 3 are alternately formed. The projection part 32 are successively embossed by twos from the tooth corresponding portion yokes 51 corresponding to the iron core teeth 2, but no projection part 32 are embossed on the tooth corresponding portion yokes 51 corresponding to the subsequent four pieces of iron teeth 2. The embossing formation of the projection parts 32 is performed with this regularity. Where the portion embossed with the projection part 32 is concerned, as shown in FIG. 7, the mid-portion 38 is formed on one surface of the metal thin plate 31, while the circular recess 39 is formed in the other surface thereof. The metal thin plate is, as shown in Japanese Patent Laid-Open No. 99432/1985, annularly wound up, with a distal end 7 of the iron core tooth 2 serving as a basis, whereby the mid-portion 38 and the circular recess 39 are overlapped with each other.

Figure 9:
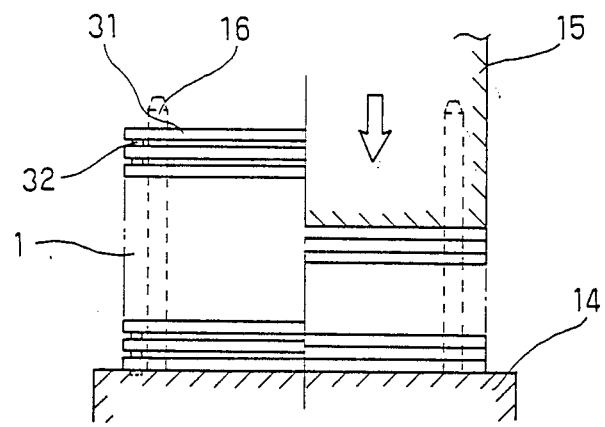
FIG. 9 is a front elevation depicting a state where the wound-up metal thin plate is press-fitted.
Figure 10:
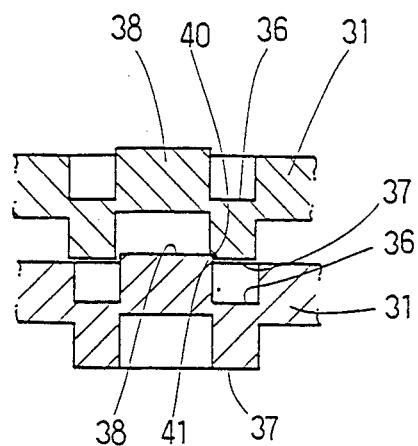
FIGS. 10 and 11 are enlarged cross-sectional views showing both the process of press-fitting the annular projection having a protruded mid-portion in the second embodiment and a state after effecting the press-fitting process.
Figure 11:
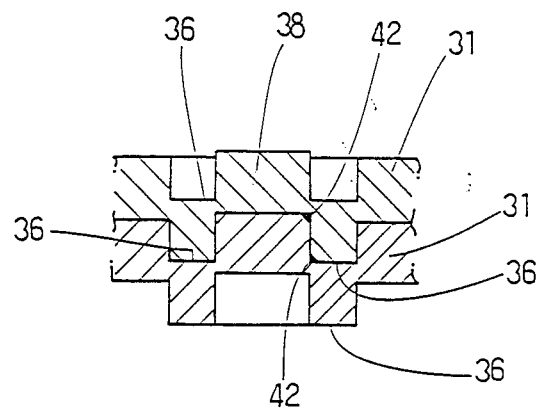

Subsequent to the above-described steps, as shown in FIG. 9, a slot arrow 16 assuming a shape corresponding to that of the slot 3 is inserted into the slot 3 of the annularly wound-up metal thin plate 31. Then, a positional deviation between the annular recess 36 and the annular projection 37 of the contiguous metal thin plate 31 is corrected. After this step, a pressing punch 15 having the same annularity as that of the metal thin plate 31 is, as indicated by an arrow, pressed with a force of approximately 10 tons on a die 14, thus effecting the press-fit of the annular projection 37 into the annular recess 36 at a time. On the occasion of the press-fitting process, as shown in FIG. 10, when the annular projection 37 is going to be press-fitted in the annular recess 36, the positions of the projection parts 32 of the contiguous metal thin plates 31 do not invariably accurately accord with each other due to distortion caused by expansion and contraction created when winding up the metal thin plate 31. Hence, an inner peripheral edge 40 of the annular projection 37 impinges upon the an outer peripheral edge 41 of the protruded mid-portion 38, thereby causing deformation. However, the contact between the annular projection 37 and the mid-portion 38 permits generation of a force acting in such a direction as to correct the positional deviation between the annular projection 37 and the annular recess 36. Consequently, the positional deviation is corrected while advancing in a heightwise direction of the protrusion of the mid-portion 38. As is obvious from FIG. 11, the annular projection 37 is ideally press-fitted in the annular recess 36 without forming a gap 42 and causing any deformation in the outer peripheral surfaces of the projection 37 and the recess 36. The outer peripheral surface of the press-fitted annular projection 37 undergoes the force acting in the radial direction from the outer peripheral surface of the annular recess 36 of the contiguous metal thin plate 31, thereby reducing the diameter thereof. On the other hand, the inner peripheral surface of the annular projection 37 is subjected to a force working in the radial direction from the inner peripheral surface of the annular recess 36, resulting in an expansion of diameter thereof. In this way, the pressures from the inner and outer surfaces act on the annular projection 37, and hence there is created a large pressure of contactual surface between the annular projection 37 and the annular recess 36. In addition, the inner and outer surfaces of the annular projection 37 and the annular recess 36 become effective contactual surfaces, so that an effective contactual area between them increases, and a joining strength also augments. A rate of contribution to the strength of joining based on the press-fit of the outer peripheral surface of the annular projection 37 into the outer peripheral surface of the annular recess 36 is remarkably larger than in the joining based on the press-fit of the inner peripheral surface of the annular projection 37 into the inner peripheral surface of the annular recess 36. For this reason, even if the position of the projection part 32 a little bit deviates, there is merely produced the gap 42 between the inner peripheral surfaces of the annular projection 37 and the annular recess 36 by virtue of the protruded mid-portion 38. It is, however, practicable to perform the press-fit without forming the gap 42 between the outer peripheral surfaces of the annular projection 37 and the annular recess 36. A drop in pressure of contactual surface between the annular projection 37 and the annular recess 36 becomes still smaller-almost nothing-than in the first embodiment. An excellent effect is therefore yielded wherein firm joining is attainable with almost no decrease in the joining force, even when producing a slight deviation associated with the projection part 32.

Figure 12:
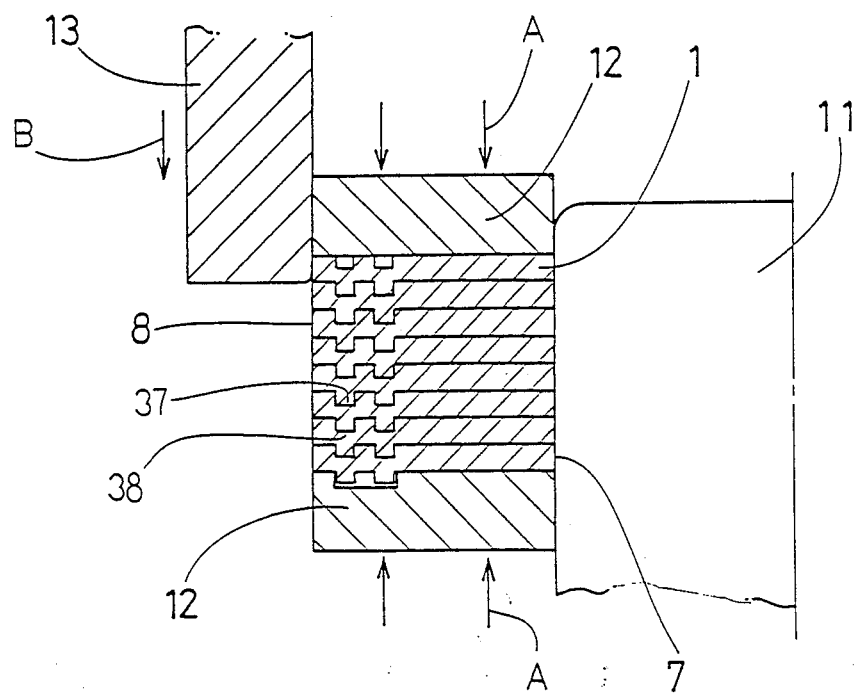
FIG. 12 is a cross-sectional view showing an ironing process.

After the press-fit has been completed, as illustrated in FIG. 12, a core metal 11 is inserted into the inner peripheral portion of the metal thin plate 31 in a press-fitted state in order to restrict an inner peripheral surface 7 of the iron core tooth 2. Clampers 12 are vertically disposed to apply the forces in the up-and-down directional deformation of the metal thin plate 31 is restrained. In this state, ironing formation is effected on an outer peripheral portion 8 by thrusting an outer-shape ironing ring 13 in the direction indicated by an arrow B of the Figure. The outer peripheral portion 8 is finished with finishing dimensions on the basis of ironing formation, thus manufacturing the winding type fixed iron core.

Figure 13:
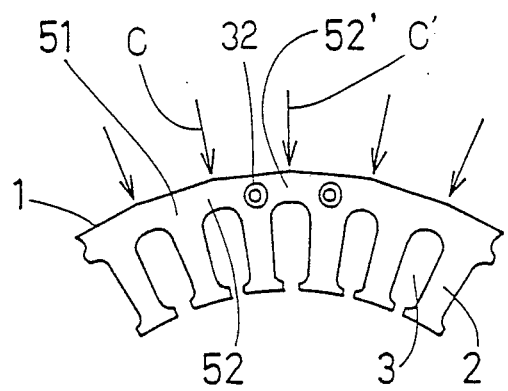
FIG. 13 is a partially enlarged schematic diagram illustrating both a configuration of deformation of the metal thin plate in a wound-up state and a state where the forces act.

After performing the ironing formation, forces are exerted from the ironing ring 13 on the laminated iron core including the press-fitted annular projection 37. Such forces are, as shown in FIG. 13, applied to the yoke 52, more specifically, to polygonal corners, because the laminated iron core is in face wind-laminated in such a polygonal configuration that the yoke 52 is crooked at corresponding portions to the slots 3. The forces (indicated by arrows C) act as centripetal forces with respect to the yoke 52 on every laminated metal thin plate 31. These forces work as shearing forces on the annular projections 37. Hence, the shearing forces acting on the projections 37 are contingent upon the centripetal forces (indicated by the arrows C) applied to the yoke 52 disposed on both sides of the annular projection 37 due to the face that: the iron teeth 2 are restricted because of the distal ends 7 being brought into contact with the core metal 11, and assume a symmetric configuration where the yokes 52 on which the forces act are disposed on both sides; and the laminated iron core is axially symmetric. The projection parts 32 are consecutively disposed by twos; and the centripetal forces (indicated by arrows C) acting on yokes 52' so positioned as the be interposed between the successive projection parts 32 are dispersed by two pieces of projections 32. As a result, the forces applied to every projection 32 are reduced, and the shearing forces decrease with this reduction. The deformation of the projection parts 32 can thus be restrained, and it is also feasible to restrain the decrease in strength of joining.

Figure 14:
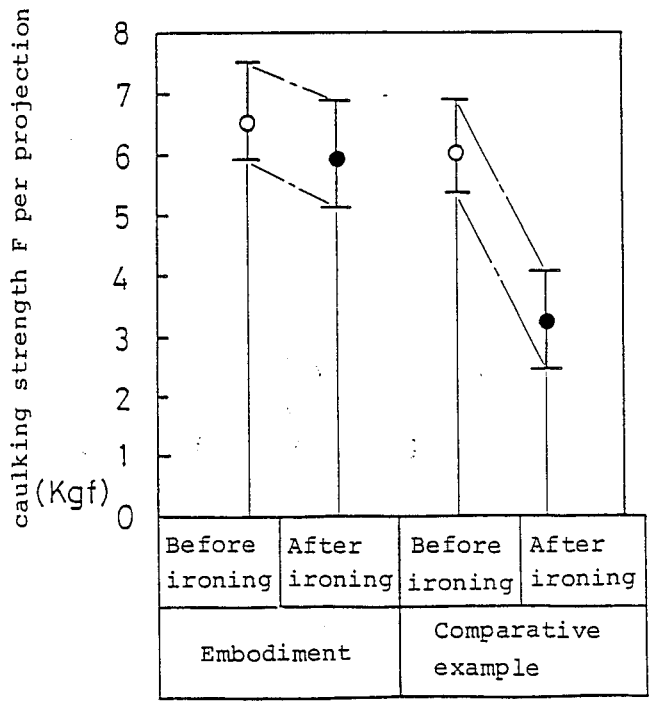
FIG. 14 is a characteristic diagram showing effects of the embodiments of the present invention.
Figure 19:
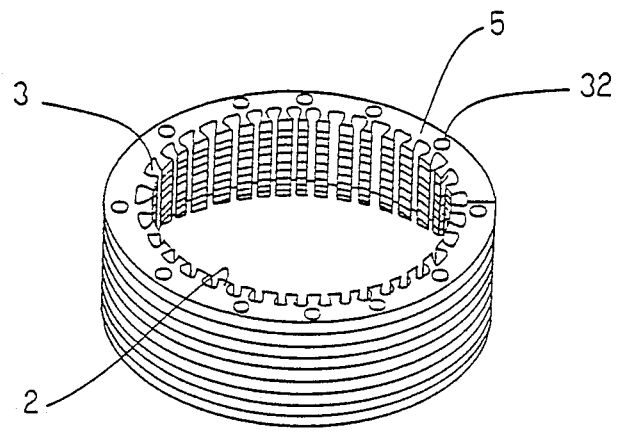
FIG. 19 is a perspective view of a laminated body, illustrating a comparative embodiment.
Figure 20:
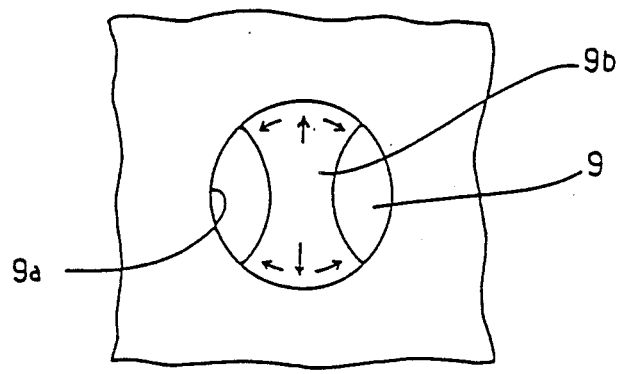
FIG. 20 is an enlarged plan view showing the principal portion of a projection in the prior art.
Figure 21:
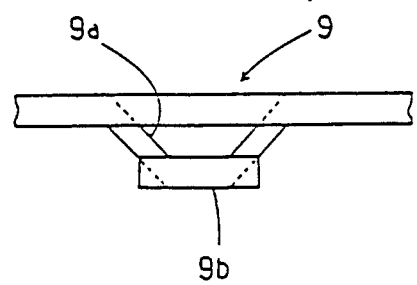
FIG. 21 is a side view thereof.
Figure 22:
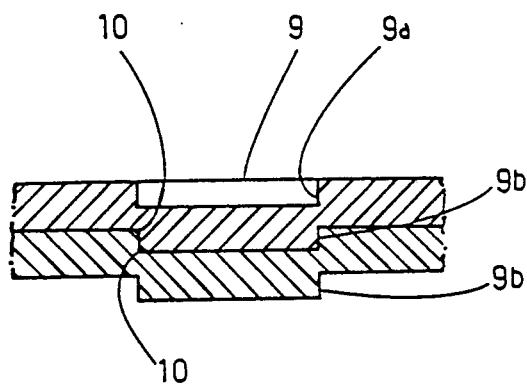
FIG. 22 is an enlarged cross-sectional view depicting a state where two sheets of metal plates formed with the annular projections in the prior art.

Next, the structure of this embodiment will now be compared, in terms of a caulking strength as a joining strength per projection, with a structure (a comparative example in FIG. 19) wherein as in the previous embodiment 36 pieces of iron core teeth are provided, and the annular projections are provided in singles with an equal spacing for every three iron core teeth. As shown in FIG. 14, since the projections have the same shape, before the ironing formation is effected, there is no big difference in joining strength between the two structures. After the ironing formation has been performed, however, the structure in the comparative example (FIG. 19) exhibits an approximately 50% drop in joining strength. In contrast with this sharp decrease, in the embodiment of the present invention, the drop in joing strength is some 10%. It can be understood that the drop in strength is remarkably restrained.

Figure 15:
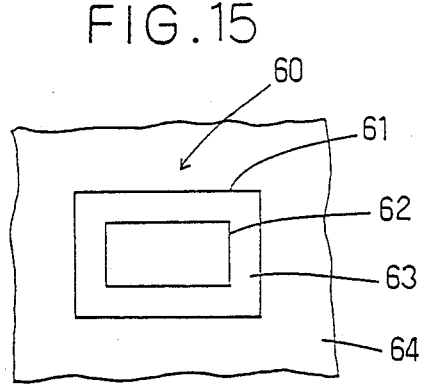
FIG. 15 is an enlarged plan view of the principal portion, showing a third embodiment of the present invention.
Figure 16:
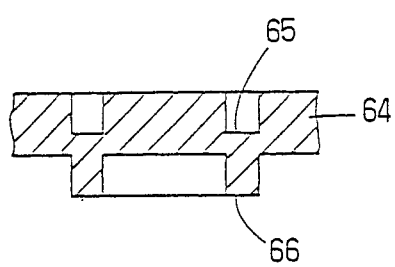
FIG. 16 is a cross-sectional view thereof.
Figure 17:
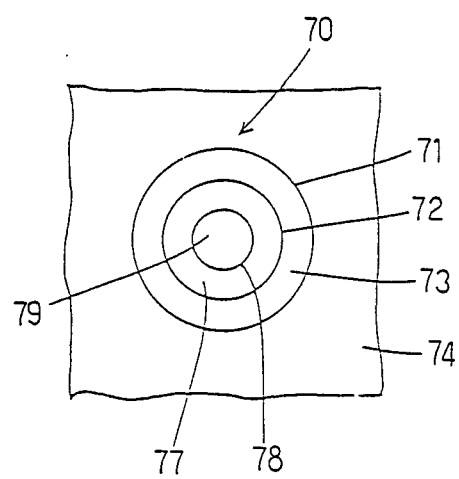
FIG. 17 is an enlarged plan view of the principal portion, illustrating a fourth embodiment of the present invention.
Figure 18:
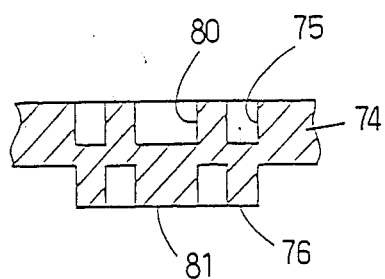
FIG. 18 is a cross-sectional view thereof.

The most preferable structure of the embossed projection in accordance with the present invention is arranged such that an annular portion encircled by two concentric circles-one is large, whereas the other is small-is embossed. This arrangement facilitates the manufacture of a jig for forming the embossed projection, regrinding and repair. The projection is not necessarily confined to this structure. Directing attention to FIGS. 15 and 16, there is depicted a third embodiment. Formation of a projection part 60 involves the steps of: embossing a substantially rectangular portion 63 the scope of which is defined by a rectangle 61 serving as an outer closed curve and another rectangle 62 serving as an inner closed curve; forming a substantially rectangular recess 65 in the top surface of a metal plate 64; and forming a substantially rectangular projection on the underside thereof. In a fourth embodiment shown in FIGS. 17 and 18, a projection part 70 is formed in the following manner. An annular portion 73 encircled by large and small two concentric circles 71 and 72 which are defined as inner and outer closed curves is embossed, whereby an annular recess 75 is formed in the top surface of a metal single plate 74, and an annular projection 76 is formed on the underside thereof. A mid-portion 77 surrounded by a circle 72 is embossed with a circular portion 79 encircled by a concentric circle 78 in order to form a second recess 80 in the top surface of the metal plate 74 and a second projection 81 on the underside thereof. Based on the structures of the third and fourth embodiments, as in the first embodiment, it is possible to firmly combine the metal plates 64 and 74 by fitting the projections 66, 76 and 81 into the recess 65, 75 and 80.

The present invention is not limited to the above-described precise embodiments. For instance, the plane configuration surrounded by the inner and outer closed curves may arbitrarily selected. In connection with the substantially rectangular configuration shown in the third embodiment, the inner peripheral mid-portion encircled by the inner closed curve may be arranged to jut out. Moreover, the arrangement of the projection groups 6 consisting of a series of projections parts 32 is not confined to the way in which the projections are provided by twos; and the projection groups 6 are disposed with a 60° spacing.

Although illustrative embodiments of the present invention have been described in detail with reference to the accompanying drawings, it is to be understood that the invention is not limited to those precise embodiments. A variety of changes or modifications amy be effected therein by one skilled in the art without departing from the scope or spirit of the invention.

What is claimed is:

1. A metal plate laminated body comprising: a plurality of contiguous metal plates each including a recess formed in an upper surface thereof by embossing an arbitrary plane configuration encircled by inner and outer closed curves and a projection formed on a lower surface thereof and having inner and outer diameters, wherein said contiguous metal plates being so laminated as to be secured to each other by press-fitting said projection into said recess.

2. A metal plate laminated body as set forth in claim 1, wherein said plane configuration is arranged to be annular.

3. A metal plate laminated body as set forth in claim 1, wherein a mid-portion surrounded by said inner closed curve is protruded higher than an outer peripheral portion associated with said outer closed curve.

4. A metal plate laminated body as set forth in claim 2, wherein with respect to the outside diameter $D_1$ and the inside diameter $D_4$ of said projection, and an outside diameter $D_2$ and inside diameter $D_3$ of said recess, press-fit spaces $D_1$–$D_2$ and $D_3$–$D_4$ are respectively 10 to 40 μm.

5. A metal plate laminated body comprising:
   substantially band-like metal plate having embossed iron core teeth and slots for receiving insertion of coils;
   a plurality of annular recesses formed in an upper surface of said metal plate by embossing an arbitrary plane configuration encircled by inner and outer closed curves; and
   a plurality of projections formed on the side of said metal plate opposite to said recesses, each having inner and outer diameters and each having a predetermined width larger than a width of each said recess, whereby said substantially band-like metal plates are annularly wound up and laminated by press-fitting said projections into said recesses.

6. A metal laminated body as set forth in claim 5, wherein said metal plate is joined by projection groups disposed with an equi-angular spacing by integrating a plurality of said projections.

7. A metal plate laminated body as set forth in claim 6, wherein said projections constituting said projection groups are disposed at proximal portions of iron core teeth.

8. A metal plate laminated body as set forth in claim 7, wherein a space between an outer periphery of said recess and an outer periphery of said metal plate and a space between said outer periphery of said recess and said slot are respectively arranged to be larger than a thickness of said metal plate.

9. A metal plate laminated body as set forth in claim 5, wherein a mid-portion provided on the side of an inner periphery of said recess is so provided on an upper surface as to be protruded with a predetermined amount from said surface of said metal plate.

10. A metal plate laminated body as set forth in claim 9, wherein said amount of protrusion is approximately 0.05 mm in width.

* * * * *